March 8, 1966 W. F. MEYERS 3,239,384

LIQUID AMMONIA DEFERRED ACTION ELECTRIC-CURRENT PRODUCING CELL

Filed Jan. 23, 1963

INVENTOR.
WILLIAM F. MEYERS
BY Howson & Howson
ATTYS.

United States Patent Office 3,239,384

Patented Mar. 8, 1966

1

3,239,384

LIQUID AMMONIA DEFERRED ACTION ELECTRIC-CURRENT PRODUCING CELL

William F. Meyers, Blue Bell, Pa., assignor to G. & W. H. Corson, Incorporated, Plymouth Meeting, Pa., a corporation of Delaware Filed Jan. 23, 1963, Ser. No. 253,308

18 Claims. (Cl. 136—90)

The present application is a continuation-in-part of application Serial No. 140,347, filed September 25, 1961, now abandoned.

The present invention relates to a novel electric current-producing cell, to a novel method of generating electric current using the same and to a novel method for preparing an electric current-producing cell for activation; and, more particularly, the invention relates to the preparation of an improved electric current-producing cell system embodying an electrolyte in which the principal solvent is liquid ammonia instead of water as is the case in conventional electric current-producing cells. The invention also relates to a battery comprising two or more of such simple cells.

The electric current-producing cells and batteries in general use for years down to the present day utilize an aqueous solution of some acid, base or salt as an electrolyte. These cells and batteries perform under standard conditions of atmospheric pressure and temperature, and most of them can be stored for reasonable periods of time without deterioration. The effect of increasing the temperature in storage tends, in general, to reduce the shelf life of these cells and batteries. Reduction in temperature below freezing causes them to become inoperative. The chief reason for this inoperative characteristic of conventional cells and batteries at low temperatures is the electrolyte solvent employed. While the introduction of certain solutes can be used to lower the freezing point of the aqueous electrolyte, it is still impossible to obtain good cell characteristics in these cells at temperatures very much below the freezing point of water. In the case where temperatures greatly below the freezing point of water are encountered, the conventional aqueous type cell will not operate. The conventional aqueous cell systems, therefore, possess limitations which render them unsatisfactory for operation at low temperatures as encountered, for example, in arctic regions or at high altitudes.

Because of the limitations of aqueous cell systems there have been attempts to prepare cell systems in which the principal solvent for the electrolyte has been one or another organic liquid, such as pyridine, methane, amide, methyl acetate, methanol, and the like. However, any advantage gained through the use of such liquids has been small relative to the limitations and the disadvantages encountered, and these systems have never achieved any commercial success.

In U.S. Patents Nos. 2,863,933, 2,937,219, 2,992,289 and 2,996,562 are disclosed and claimed cell systems in which the electrolyte solvent is liquid ammonia. In the cell system of Patent 2,863,933, the anode comprises an electropositive metal, the anolyte comprises a salt dissolved in the liquid ammonia, the cation of which corresponds to the electropositive metal of the anode, and the catholyte comprises an ammonium and/or metal salt dissolved in the liquid ammonia the metal cation of which develops an electrolytic potential in liquid ammonia at least 0.75 volt less than that developed by the metal of the anode in liquid ammonia.

The cell system of Patent 2,937,219 comprises an anode, a depolarizing cathode and an electrolyte comprising liquid ammonia having material dissolved and ionized

2 therein to render it electrically conductive, at least the anolyte portion of which comprises ammonium ions.

In Patent 2,992,289 are disclosed and claimed a vapor-activatable cell comprising a cell compartment and, within the cell compartment, an anode, a cathode and electrolyte solute by itself substantially inactive to generate current with said anode and cathode, and means for introducing ammonia to the compartment for contact with the solute to form active electrolyte.

In Patent 2,996,562 are disclosed and claimed the use of elemental sulfur as a depolarizer in ammonia cells; while in copending application Serial No. 94,821, filed March 10, 1961, are disclosed and claimed the use of nitro- and nitroso-substituted aromatic compounds as depolarizers.

In copending application Serial No. 2,010 filed January 12, 1960, now Patent 3,083,252, are disclosed and claimed systems in which a sulfate of a heavy metal below ferrous iron in the electrochemical series is employed as depolarizer.

While the stated elemental sulfur, nitro- and nitroso-substituted compounds and heavy metal sulfates represent improvements over prior depolarizing materials, especially in simple cells, it has been found that in larger battery units made up of a plurality of such cells in a casing, there is upon activation of the battery for use, generation of heat and expansion which seriously affects the operation of the battery and which might lead to a pressure increase resulting in damage to the battery. This is particularly true with the heavy metal sulfates. In addition, in such prior ammonia cells, the storage of the ammonia in a compartment or ampoule associated with the cell involves a significant penalty in weight and volume; compartments of activating fluid are frequently as large as the cell or battery they must activate. Any reduction in the size of the activator component is highly desirable particularly in view of the uses to which cells of the present type are put.

It is the principal object of the present invention to provide an improved electric current-producing cell of the ammonia system.

A further object of the invention is to provide an improved electric current-producing cell system of the ammonia type as disclosed and claimed in the foregoing patents and copending applications, the disclosures of which are incorporated herein by reference.

Still another object of the invention is to provide an improved electric current-producing cell of the ammonia system which possesses greater activity and/or capacity than heretofore.

Another object of the invention is to provide an improved electric current-producing cell of the ammonia system wherein the volume of activator required at the time of activation is significantly reduced from that required in previous cells of the ammonia system.

A further object of the invention is to provide an improved electric current-producing cell of the ammonia system wherein generation of heat and expansion at the time of activation is markedly less than in prior cells of the ammonia system.

Still another object of the invention is to provide an improved method of generating electric current by chemical means with the ammonia system.

Further principal objects are to provide a novel cathode depolarizing material for use in cells and batteries of the ammonia system and to provide a method for making said material, as well as to provide a method for preparing certain cell systems of the ammonia type for activation.

Other objects, including the provision of a novel electric current-producing battery possessing the herein-mentioned features and the generation of electric current therewith, will become apparent from a consideration of the following specification and drawings and claims.

Before discussing the present cell in detail, it will be helpful to consider the nature of liquid ammonia and of the liquid ammonia system. Under ordinary atmospheric conditions ammonia is a colorless gas. Upon cooling, however, under one atmosphere pressure, this gas can be converted to a liquid at about −33° C. Liquid ammonia freezes at about −77° C. Theoretically, liquid ammonia ionizes mainly into the ammonium ($NH_4^+$) ion and amide ($NH_2^-$), imide (NH=) and nitride (N≡) ions, the ammonium ions corresponding to the hydrogen ions of the aqueous system and the amide, imide and nitride ions corresponding to the hydroxyl ions of the aqueous system. However, as a practical matter, liquid ammonia, does not ionize measurably. Under present day chemical terminology, the names of classes of inorganic compounds are based on the aqueous system. In other words, ammonium hydroxide is normally considered to be a base while ammonium compounds produced, for example, by the neutralization of ammonium hydroxide with an acid, are normally considered to be salts. It will be seen that in the liquid ammonia system, conventional terminology may be misleading in that, in the liquid ammonia system, ammonium compounds provide ammonium ions and hence ammonium hydroxide is actually a weak acid with respect to liquid ammonia, and ammonium salts, such as ammonium thiocyanate, are actually strong acids. Water, since it forms ammonium ions in the liquid ammonia system, functions as a weak acid. The addition of water to liquid ammonia is similar to adding ammonium hydroxide. By the same token the addition of an acid (HA) results in the formation of ammonium ions and hence produces acidity ($NH_4A$) in the liquid ammonia system. The bases in the liquid ammonia system, the amides, imides and nitrides, are in general insufficiently soluble for practical electrolyte compositions. There are many analogies between the function of ordinary metal salts in liquid ammonia and their function in water. It will be seen, however, that in electrolytes wherein liquid ammonia is the principal solvent, "acidity" or "neutrality" may be controlled by the addition of ammonium compounds, water or acid, on the one hand, or of amides, etc. on the other. Herein, reference is made to ammonium compounds, that is hydroxide or salts, in accordance with conventional terminology in spite of the fact that, in the liquid ammonia system, they are the acids.

Liquid ammonia by itself is not sufficiently conductive to serve as an electrolyte in an electric current-producing cell. As in the case of water in the aqueous cell systems, material freely ionizable in the solvent, ammonia, must be dissolved in the liquid ammonia in order to render it sufficiently conductive.

As in aqueous cell systems, polarization of the cathode presents problems in ammonia cell systems. By "polarization" is meant, the formation, at the cathode, of hydrogen or other reaction products which tend to raise the cathode potential and/or produce loss of contact between the cathode conductor and the electrolyte. The prevention of this phenomenon is termed "depolarization." Depolarization can be accomplished by physical means, based on the ability of hydrogen to diffuse through solid materials, or by chemical means through the use of a material, in contact with the cathode conductor, which reacts with polarizing products thereby preventing or minimizing their formation. Examples of materials most often used heretofore for this purpose in ammonia cell systems are manganese dioxide and lead dioxide. With managanese dioxide and other depolarizing materials heretofore used there are limitations due to effects thereon of acid or solutes in the electrolyte.

It has been found that a sulfate of a heavy metal below below ferrous iron in the electrochemical series (such as lead, nickel, tin, copper, mercury, silver, gold and ferric iron) serves as an excellent depolarizer in the ammonia cell system and is less sensitive to the above-mentioned limitations, and this is the subject matter of copending application Serial No. 2,010 referred to above. However, as also mentioned above the use of such a heavy metal sulfate possesses certain limitations particularly in a battery made up of a plurality of individual cells in a single casing. In such case it has been found that, upon activation of the battery for use, heat is generated which impairs the maximum effectiveness of the battery. Depending upon the construction of the battery in terms of heat loss provided, pressures can be built up within the battery which might be damaging to the device. In single cells and batteries affording sufficient heat loss this is not a serious problem. Upon activation, swelling of the depolarizer and an expansion of the cell also occur. While a single loosely built cell functions adequately, larger firmly constructed cells or batteries tend to burst their containers or fail to activate.

It has been found that, if the heavy metal sulfate is ammoniated prior to final activation of the cell the resulting ammoniated compound is particularly adapted for use in an ammonia cell system as a depolarizer, and that there is considerably less generation of heat and pressure upon activation even in batteries made up of a large number of cells in a single casing. Moreover, much less ammonia is required upon subsequent activation of the cell.

The ammoniation of the heavy metal sulfate may be accomplished prior to incorporation in the cell or may be accomplished entirely within the cell, or may be accomplished partly outside the cell and completed subsequently within the cell. In any event the ammoniated heavy metal sulfate is incorporated in the cell in contact with the cathode conductor at least by the time the cell is to operate and prior to activation of the cell.

Ammoniation of the heavy metal sulfate outside the cell may be accomplished by mixing the selected heavy metal sulfate with the acidified liquid ammonia, that is liquid ammonia containing ammonium ions. The provision of ammonium ions in liquid ammonia, as by dissolving an acid (HA) or an ammonium salt ($NH_4A$), is fully discussed hereinafter in connection with the discussion of the electrolyte of the cell system, and such ammonium-ion containing ammonia solutions may be employed in ammoniating the heavy metal sulfate in accordance with the present invention.

On the other hand, ammoniation may be accomplished by contacting the heavy metal sulfate with gaseous or liquid ammonia, either outside the cell, or, most advantageously, in situ in the cell. In this latter case the amount of ammonia admitted to the cell, while sufficient to ammoniate the heavy metal sulfate, will be insufficient to activate the cell. In this latter case also, it is desirable that the heavy metal sulfate be preliminarily treated before incorporating in the cell to insure proper ammoniation. This preliminary treatment may involve simply mixing a small amount of an acid (in ammonia), such as an ammonium salt, with the heavy metal sulfate so that upon subsequent contact with ammonia in the cell, ammonium ions will be provided. This preliminary treatment may also be, and preferably is, partial ammoniation. Thus, the heavy metal sulfate may be partially ammoniated outside the cell, as by using the above-discussed acidified liquid ammonia method, the partially ammoniated heavy metal sulfate then being incorporated in the cell in contact with the cathode conductor and subsequently further ammoniated in situ in the cell.

The ammoniation reaction involves, it is believed, the addition of the ammonia molecule $NH_3$, as such (and not the ammonium ion) to the heavy metal sulfate to provide the compound $$M_{\frac{X}{2}}SO_4 \cdot YNH_3$$

where M is the stated heavy metal, $x$ is the valence of M, and Y is an integer which may range from 1 to 6. The exact value of Y will depend upon the particular heavy metal as well as the conditions. Hence, in ammoniating the sulfate, at least sufficient ammonia will be used to supply the ammonia to be combined with the sulfate. Preferably, excess ammonia will be used, which excess can be at least partially removed after the ammonating reaction is complete.

For example, in ammoniating using acidified liquid ammonia, finely divided mercuric sulfate may be added to a large excess of liquid ammonia containing ammonium ions. During the ensuing reaction heat is evolved, the mercuric sulfate increases in volume and turbulence occurs and continues for about an hour. This produces an ammoniated mercuric sulfate $HgSO_4.4NH_3$. Excess free ammonia is removed by decantation and evaporation. Although the tetraammoniated mercuric sulfate is stable at 25° C. under a partial pressure of ammonia gas of above 5 p.s.i.a, two of the four molecules of ammonia are loosely bound and can readily be removed by heating to 150° C. under vacuum to provide $HgSO_4.2NH_3$. Thus, in the case of mercuric sulfate, Y in the foregoing formula can be 2 or 4, and diammoniated mercuric sulfate and tetraammoniated mercuric sulfate, particularly the latter, are especially preferred in accordance with the present invention.

The same thing can be accomplished by adding ammonia to the cell already containing the heavy metal sulfate, which may be treated preliminarily as stated, in place in contact with the cathode conductor so that the ammonia contacts the heavy metal sulfate and ammoniates it in situ. The degree of ammoniation will depend upon the amount of ammonia admitted to the cell. For example, to obtain and maintain tetraammoniated mercuric sulfate in the cell, some excess of ammonia will be introduced to provide the requisite partial pressure for stability.

The ammoniated products have varying degrees of stability as already noted, depending upon the particular heavy metal sulfate selected. Thus, diammoniated mercuric sulfate is a white powder which is stable even under a vacuum of 10 microns of mercury at a temperature of 150° C. However, this material should be protected from light, particularly during storage, inasmuch as light has been found to cause decomposition. On the other hand, ammoniated lead sulfate and tetraammoniated mercuric sulfate are less stable, and their handling and storage will require lower temperatures and/or use of an ammonia-containing atmosphere as referred to above.

The cell device is marketed without free liquid ammonia in the cell compartment, being activatable upon the admission of ammonia to the cell compartment. Thus, in this embodiment of the invention, the cell device comprises a cell compartment, and within said compartment, an anode, a cathode conductor, and the stated ammoniated heavy metal sulfate (free of liquid ammonia) in contact with the cathode conductor, and means for introducing ammonia to said cell compartment for contact with said anode, cathode conductor, and the stated ammoniated heavy metal sulfate. As will appear hereinafter such means may include an ammonia-containing reservoir associated with the cell device and adapted to release ammonia into the cell compartment. In this connection, the cell may be marketed with electrolyte solute (free of liquid ammonia) in place therein, or may be marketed devoid of electrolyte solute, in which latter case activation may be achieved by introducing electrolyte (solution of electrolyte solute in liquid ammonia) to the cell.

Reference has been made above to ammoniating a heavy metal sulfate in situ in the cell. It has been found that this is not confined to the heavy metal sulfate but is applicable to any ammonia cell system depolarizer reactable with ammonia. Such depolarizers include, in addition to the heavy metal sulfates; elemental sulfur; nitro- and nitroso-substituted aromatic compounds; other heavy metal salts, like cupric chloride; and the like. Such compounds may be ammoniated readily, in situ in the cell, using liquid or gaseous ammonia. The ammoniated compounds are insufficiently stable to permit, as a practical matter, partial or complete ammoniation outside the cell as can be accomplished with heavy metal compounds using acidified liquid ammonia.

Referring to the nitro- or nitroso-substituted aromatic compound, it may be any aromatic organic compound, such as a benzene, naphthalene, biphenyl, anthracene, or the like, containing at least one $—NO_x$ group attached directly to a ring carbon atom of the aromatic nucleus. In the formula $—NO_x$, $x$ is either 1, in which case the group is a nitroso group (—N=O), or 2, in which case the group is a nitro group ($—NO_2$). When more than one such $—NO_x$ group is present each will, of course, be directly attached to different ring carbon atoms, preferably non-adjacent ring carbon atoms, and each $—NO_x$ group on the compound may be the same or different. Generally, there will be no more than four $—NO_x$ groups present, and the preferred compounds contain 2 or 3 $—NO_x$ groups.

As is known, nitro groups attached to ring carbon atoms can be reduced progressively through nitroso to amino. In the operation of ammonia cells utilizing aromatic compounds containing at least one nitro group as depolarizers, it is believed that similar reduction occurs. Furthermore, since the nitroso group is reducible as is the nitro group, the nitroso group and the nitro group function similarly, the former being one stage further along in the reduction sequence than is the latter.

In the $—NO_x$-substituted aromatic compounds, the nuclear hydrogens of the aromatic nucleus may be replaced by alkyl, alkoxy, carboxyl, cycloalkyl, aryl, arylalkyl, halogen, and the like groups. Compounds having substituents on the aromatic nucleus in addition to the $—NO_x$-group or groups have been found to be useful, and, as far as is presently known, there is no limitation as to the character of the substituents, other than the $—NO_x$ group or groups, and they may be organic or inorganic in nature, although individual substituents may affect in degree the operating characteristics of the cell. Hence, where reference is made herein to $—NO_x$-substituted "aromatic compound," "benzenes," "naphthalenes," etc., it will be understood to include such substituted derivatives as well as unsubstituted (except for the $—NO_x$ group or groups) compounds, unless otherwise specified. The presently preferred compounds are the di- and trinitrobenzenes.

Examples of $—NO_x$-substituted aromatic compounds are: nitrobenzene, o-chloronitrobenzene, m-nitrophenol, o-nitrotoluene, p-nitroxylene, $\beta$-nitronaphthalene, nitronaphthoic acid, nitronaphthol, nitroanthracene, m-dinitrobenzene, 3,5-dinitrobenzoic acid, p-dinitrotoluene, 1,3,5-dinitrochlorobenzene, 1,3-dinitronaphthalene, 1,4-dinitronaphthalene, 2,4-$\alpha$-dinitronaphthol, $\beta$-dinitroanthraquinone, 1,3,5-trinitrobenzene, 2,4,6-trinitrotoluene, picric acid, trinitroxylene, 1,3,5,-trinitronaphthalene, nitrosobenzene, p-nitrosotoluene, 2-nitrosoparacymene, 4-chloronitrosobenzene, 4-methoxynitrosobenzene, 2-benzylnitrosobenzene, 3,5-dicyclohexylnitrosobenzene, N,N-dimethyl-p-nitrosoaniline, 2-methylnitrosonaphthalene, ethyl-5-butylnitrosonaphthalene, 2,5-dinitrosoparacymene, 5-chloro-1,3-dinitrosobenzene, 2.5-dibenzyl-1,3-dinitrosobenzene, 2,4,5 - trichloro-1-3-dinitrosobenzene, 1,4-dinitrosonaphthalene, 2-ethoxy - 1,5 - dinitrosonaphthalene, 1,4,5-trichloro-2,7-dinitrosonaphthalene, and the like.

The in situ ammoniation of the present invention contemplates the formation of a dry (substantially free of liquid ammonia), solid product in which the depolarizer and ammonia have combined. The relative proportions of ammonia to depolarizer will, of course, depend upon the particular depolarizer and upon the conditions, particularly pressure. In any case, at least one molecule of ammonia will be combined with the depolarizer. Since the magnitude of the advantages realized from the present invention increases with the degree of ammoniation, it is preferred that substantially the maximum ammoniation, consistent with the formation of a dry, solid reacting product and lack of final activation, be achieved. This can readily be determined for any of the depolarizers by: slowly admitting ammonia from a source of known pressure into the cell, and measuring voltage of the cell with a voltimeter, such as one having a sensitivity of 1000 ohms per volt; and, when the cell begins to generate an appreciable voltage, like 1 volt, removing the cell from the source of ammonia and letting ammonia gas escape from the cell until a cell pressure is reached where the cell is essentially inactive. Measuring the gain in weight of the cell gives the substantially maximum, and hence preferred, amount of ammonia that can be consumed by the particular depolarizer. Thereafter, that amount of ammonia, either in gaseous or liquid form, can be admitted to cells, utilizing the same depolarizer. The cell pressure level at maximum ammoniation can also be noted, and thereafter the pressure of the ammonia source can be maintained at approximately that level insuring the admission of the proper amount of ammonia in the preparation of subsequent cells utilizing the same depolarizer. Utilizing the foregoing technique it will be found that widely differing amounts of ammonia can be taken in by different depolarizers according to the present invention. Thus, the molecules of ammonia per molecule of depolarizer for several typical depolarizers are as follows: mercuric sulfate, 4; silver sulfate, 5; m-dinitrobenzene, 10; elemental sulfur, 3–4.

The reaction between the depolarizer and ammonia according to the present invention need not be one of simple addition as in the case of the heavy metal sulfates. For example, the ammoniating reactions with nitroaromatic compounds and with elemental sulfur may be somewhat more complex; it being possible that sulfur amides are formed with elemental sulfur. In any event, the ammoniating reaction is generally reversible.

Thus, ammoniation of the depolarizer in situ in the cell, in accordance with the present invention, is to be distinguished from activation of the cell, for the cell after ammoniation of the depolarizer is essentially inactive as a current generating device. It will be noted from the foregoing that maximum ammoniation may cause momentary or transistory generation of energy until excess ammonia is removed returning the cell to the inactive state. This transistory generation of energy is not true or final activation of the cell. Once ammoniation has been carried out according to the present invention, additional ammonia is required to dissolve the solute and form the necesary liquid electrolyte solution required for generating current according to the capacity of the cell. In many respects, the present invention is a "slaking" operation in which the "thirst" of the depolarizer for ammonia is at least partially satisfied as a separate step prior to activation of the cell with ammonia, and is thus, in this respect, analogous to the slaking of lime to form dry hydrated lime as a requisite step prior to utilization of the hydrated lime involving mixing it with water.

The ammoniated depolarizer may be employed as the sole depolarizer or may be used in conjunction with other depolarizing materials. It has also been found that the stated ammoniated depolarizer serves to regenerate the electrolyte solvent so that the present cell is less electrolyte-limited than when non-ammoniated depolarizer is used. This is most desirable since, in general, the capacity of powerful cells is limited by the quantity of electrolyte which can be held by the cell. The improvement through the use of the stated ammoniated depolarizer in accordance with the present invention manifests itelf largely through prompt and efficient operation without generation of heat and swelling and its attendant difficulties particularly in large cells and in batteries. Ammoniation of the depolarizer prior to activation means less ammonia required for activation, and this reduction in volume can amount to as much as 20%.

For illustration of cells embodying the present invention, reference may be had to the drawings in which.

Figure 1:
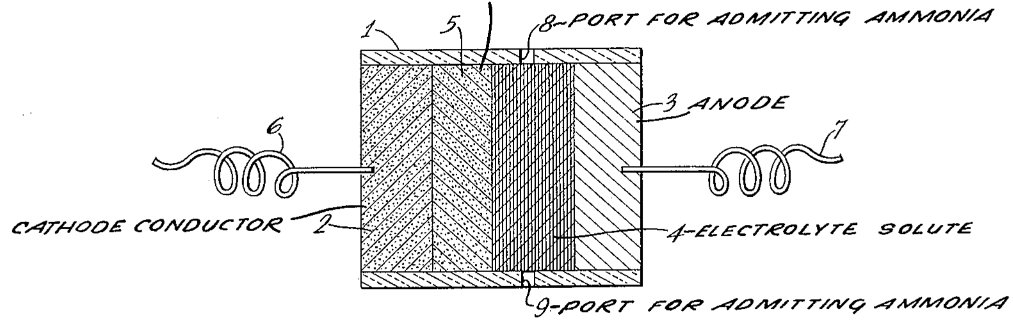
FIGURE 1 represents, schematically, a side elevational, sectional view of one form of simple cell to which the present invention is applicable.

Referring to the electrolyte, during generation of current the stated ammoniated depolarizer serves to regenerate the electrolyte solvent by releasing ammonia upon reduction of the depolarizer. In addition, depolarizers like the heavy metal sulfates serve to regenerate electrolyte solute so that, although initially some solute soluble in the liquid ammonia and serving to render it conductive may be required, the capacity of the cell may not be limited by the amount of solute present. Other depolarizers like the nitro-and-nitroso-substituted aromatic compounds and elemental sulfur, can serve as electrolyte solute either by themselves or in conjunction with additional solute. Where a solute in addition to the depolarizer is included in the cell it should be noted that the nature of such solute in conjunction with the nature of the other components of the cell, particularly the anode, affects the characteristic of the cell. An ammonium salt soluble in liquid ammonia at least to the extent hereinafter discussed or a compound which forms with the ammonia an ammonium salt in solution therein to a concentration hereinafter discussed, may be employed as the solute. Of the ammonium salts, ammonium thiocyanate and ammonium perchlorate are particularly advantageous. These salts are freely soluble in liquid ammonia. Other salts that may be mentioned as being applicable are the cyanides, chlorides, cyanates, fluoborates, iodides, nitrates, nitrites, and the like. A metal salt or salts may be employed, and when the cation is a metal, it will generally be an electropositive metal above ferrous iron in the electro-chemical series, particularly lithium, sodium, potassium, caesium, rubidium, calcium, strontium, barium, magnesium, zinc, aluminum, beryllium, manganese, and the like. Normally, with respect to the anolyte solute, the metal salt will be at least as electro-positive as the anode metal. Salts of the alkali and alkaline earth metals, especially salts of potassium, lithium, calcium and magnesium, and zinc salts are preferred. Of all the salts, the ammonium, potassium and lithium salts have been found to be particularly advantageous.

The acidity that can be tolerated in any particular cell system may be limited by the nature of the other components of the cell, particularly the anode. As will be pointed out more in detail hereinafter, in some situations care must be exercised in controlling the acidity of the electrolyte to avoid undue local action at the anode. Hence, the requisite conductivity of the electrolyte may be provided in part by metal salts, which, in the ammonia system, are more or less neutral.

Since, the anode may favor one set of conditions, e.g. low acidity, and the cathode may favor another set of conditions, e.g. high acidity, the solute employed may often be a compromise between these two extreme considerations. On the other hand, the cell compartment may actually be divided into two separate sections namely, an anode section and a cathode section, with differing solutes in each, the two sections being separated by a porous or permeable diaphragm. In such case, separate electrolyte portions will be formed, namely an anolyte and a catholyte.

There are other factors which also determine the amount of solute dissolved in the liquid ammonia to provide the electrolyte. One of the primary considerations in this connection is the temperature under which the cell is designed to operate. In general, the conductivity of the electrolyte decreases with decreasing temperature. For any given solute at any particular temperature, there is an optimum concentration of solute to provide optimum conductivity. Below and above this optimum concentration, the conductivity fallls off. In other words, by plotting conductivity versus concentration of solute at any given temperature, there results a curve which starts out at the low side of conductivity, ascends to one or more peaks and then drops off again. Thus, if the cell is to operate at an exceedingly low temperature, and it is desired to provide maximum conductivity at that temperature, the concentration of solute must be controlled. When the cell is to operate at higher temperatures, such as high atmospheric temperatures or above, it is often desirable to incorporated sufficient solute to raise the boiling point of the electrolyte to above the temperature conditions to which the cell is to be subjected to avoid the use of pressure. Again, when the cell is to operate at exceedingly low temperatures, it will be necessary that the electrolyte remain as a liquid at that operating temperature. For example, with certain molar proportions of ammonium triocyanate, ammoniated ammonium thiocyanate freezes out. Thus, when operating at these temperatures, the amount of solute employed should be substantially less than that providing, with the ammonia, the ammoniated compaund which freezes out at those temperatures. For example, $NH_4SCN.NH_3$ freezes out at about $-20°$ to $-40°$ C., so that a cell designed to operate at this temperature should not have, as its entire electrolyte, a mixture of ammonium thiocyanate and ammonia in a 1:1 molar ratio.

Another factor to be taken into consideration in determinating the amount of solute dissolved in the ammonia solvent is the effect of that concentration on the operation of the electrodes. For example, with some anode materials, such as zinc, the anode product, for instance zinc thiocyanate, may precipitate out in the electrolyte at high discharge rates and low temperatures if too much solute is dissolved at the anode region. When such a solid product is formed at the anode region, the anode becomes blocked increasing the internal resistance of the cell, and, in many cases, the anode potential is reduced. Similar consideration is applied to the cathode; however, the nature of the cathode material and/or type of solute will frequently result in different ranges of concentration requirements.

The above-mentioned considerations being borne in mind, the amount of solute actually employed may range up to the limits of its solubility in the liquid ammonia at the temperature under consideration. The amount of solute may actually exceed the limits of its solubility in the liquid ammonia. Thus, aside from the questions of optimum conductivity, polarization, and of freezing out of solvated compounds as discussed above, it is not material that excess solute be present.

In order to provide significant current capacity in the cell, it has been found necessary to provide a concentration of solute in the liquid ammonia of at least 1 mol percent. Particularly advantageous results are obtained when the concentration is at least about 2 mol percent. As to the upper concentration limits for the solute, it is obviously impossible to set a specific figure and say that the compositions on one side are all operable for any purpose and those on the other side are not, since much depends upon the particular solute selected, the nature of the anode and of the cathode, the operating characteristics desired, the temperature and pressure conditions under which the cell is to be operated, and the like, all of which factors must likewise be taken into consideration in conventional aqueous current-producing cell systems. However, as stated above, the amount of solute employed may even exceed its solubility in the ammonia.

The foregoing discussion has dealt for the most part with the solute broadly and no distinction has been made between the situation where the electrolyte to be formed is uniform throughout and the situation where the electrolyte is formed into two components—the anolyte and the catholyte—in which the anolyte and the catholyte differ as to composition. In certain instances it is desirable that the anolyte, that is the portion of the electrolyte adjacent the anode, and the caholyte, that is the portion of the electrolyte adjacent the cathode, differ from each other as to composition. In such case the solute adjacent the cathode in the cathode section of the cell may differ from the solute adjacent the anode in the anode section of the cell. Where the anolyte and catholyte are to differ, the anode section and the cathode section of the cell compartment may be separated from each other by means of a porous or permeable diaphragm. Even in this case, of course, the anode and the cathode will be in ionic flow relationship. In any event, in accordance with the present invention, the ammoniated depolarizer will be present in the cathode section for contact with the cathode conductor.

In one form of cell system in which the anolyte and catholyte differ, the anode comprises an electro-positive metal of the type discussed below, and the solute adjacent the anode comprises a metal salt the cation of which is a metal corresponding to the electro-positive metal of the anode or a metal higher in the electromotive series than the electro-positive metal of the anode, that is, a metal of at least the same level in the electromotive series as the electro-positive metal of the anode; and the solute adjacent the cathode comprises an ammonium salt and/or a metal salt. In another form of cell system, the preceding elements will be used except that the solute adjacent the anode will be an ammonium salt instead of said metal salt.

Referring to the electrodes, the anode generally comprises an electro-positive metal. Any metal above ferrous iron in the electro-chemical series, particularly lithium, sodium, potassium, caesium, rubidium, calcium, strontium, barium, magnesium, zinc, aluminum, beryllium, manganese, and the like, or mixtures thereof as well as alloys containing one or more of these metals, is suitable. Of the metals, the alkali and alkaline earth metals and zinc, especially lithium, calcium, magnesium, and zinc, particularly the first, are preferred.

The exact nature of the materials selected as anode will depend upon many factors, including the characteristics desired in the cell. The characteristics desired may dictate the type of electrolyte required, which, in turn, may determine which material should constitute the anode. For example, if high voltage is the criterion, a metal which is highly active, such as lithium, calcium, and other alkali and alkaline earth metals and alloys containing them, may be selected for the anode. If a moderate voltage is desired, less active of the alkaline earth metals, such as magnesium, and other metals such as manganese, zinc, and alloys containing them may be selected.

Reference has been made above to the use, as anode, of alloys containing one or more of the metals listed. The alloying of the anode metal with another metal reduces the availability of the anode metal, and hence, its chemical activity. Thus, by appropriate selection of alloys containing highly active anode metals alloyed with less active metals, it is possible to employ as anode an alloy containing a highly-active metal in situations where the use of that metal by itself would be impractical.

Examples of such alloys are lithium aluminum alloys, lithium amalgams, lithium zinc alloys, lithium magnesium alloys, lithium lead alloys, and the like.

The cathode conductor may be made up of a conductive material that is inert to the electrolyte such as lead, electrolytic carbon, platinum, boron, zirconium, tantalum, stainless steel, silver, or the like. Of this group, platinum, lead, silver and carbon are the preferred materials. However, in applications where carbon is mechanically unsuitable, a conducting protective film, like silver, may be used to coat and protect a reactive metal cathode conductor like copper.

The design or construction of the cell compartment, with which the present invention is not principally concerned, may vary widely depending upon the particular use intended for the cell. The cell may be constructed from a wide variety of relatively cheap and available materials, for example, iron, glass, ceramic material, rubber or synthetic rubber-like materials, synthetic resins, and the like. The material selected, of course, should be chemically resistant to liquid ammonia.

Likewise, the electrodes may be of any desired shape, such as flat sheets, rods, rolls, cylinders, bobbins, discs, or the like.

It is generally desired to render the ammoniated depolarizer more conductive, and to accomplish this, finely-divided conducting material, such as carbon, silver, and the like, may be mixed with the depolarizer (or ammoniated heavy metal sulfate when this is prepared outside the cell). Such conducting material should be substantially insoluble in liquid ammonia. The depolarizer (or ammoniated heavy metal sulfate) and conducting material may be mixed together in finely-divided form, and may be formed into a paste using an aqueous solution of a salt of the type discussed hereinabove, or a solution of a polymer, like polystyrene, in an organic solvent, like toluene. Such a paste may then be applied to the cathode conductor and dried. The relative proportions of ammoniated depolarizer to finely-divided conducting material may vary widely, and ratios of the former to the latter as low as 1:5 (parts by weight) may be used. Particularly advantageous ratios are from about 1:3 to about 5:1.

The essential current generating reaction of the present cell is the oxidation of the anode metal and the reduction of the ammoniated depolarizer. The formation of anode metal ions includes ammoniation. Hence, the current generating life of the cell is limited by the quantity of anode metal, ammonia and depolarizer available for reaction. Therefore, the amount of ammoniated depolarizer employed will be dictated largely by the size of the cell and its components and design considerations, all of which is well known to those skilled in the electric current-producing cell art where the same factors are encountered.

Figure 2:
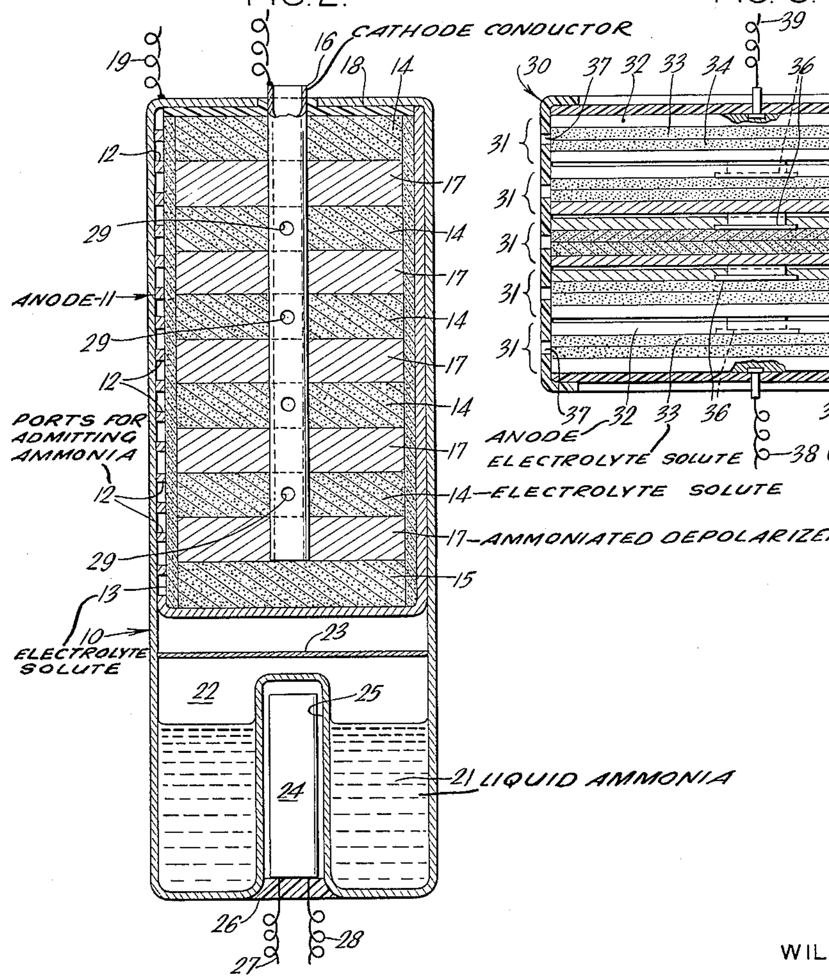
FIGURE 2 represents, schematically, a side elevational, sectional view of another form of cell to which the present invention is applicable.

Referring then to the drawings, FIGURES 1 and 2, as stated, illustrate schematically cell systems embodying the present invention. The cell of FIGURE 1 comprises a cylindrical non-conducting casing 1, a cathode conductor 2 and an anode 3. Paper separators 4 are impregnated with a suitable electrolyte solute as described hereinabove. 5 represents a body comprising the stated ammoniated depolarizer in contact with cathode conductor 2, and this body may consist of a mixture of finely-divided ammoniated depolarizer and finely-divided inert conducting material such as carbon (graphite). When the depolarizer is a heavy metal sulfate, it may be at least partially ammoniated prior to the admixture with the conducting material and incorporation in the cell, or may be ammoniated (or further ammoniated) after incorporation in the cell. The other depolarizers will normally be ammoniated in situ in the cell. Cathode conductor 2 and anode 3 are provided with suitable conducting wires 6 and 7, respectively. Ports 8 and 9 are provided in casing 1 through which ammonia is admitted, either in liquid form or as a vapor. When ammoniation is to be accomplished in situ in the cell, gaseous or liquid ammonia, in amount required for ammoniation, may be admitted through ports 8 and 9. After ammoniation, ports 8 and 9 may be temporarily sealed until it is desired to activate the cell. Where the cell is to be activated through the admission of ammonia, the circuit is completed and ammonia in an activating amount is admitted through ports 8 and 9. The admitted ammonia if in vapor form condenses in contact with the electrolyte solute to dissolve the solute thus forming the complete electrolyte and activating the cell. On the other hand, before completing the circuit, the ammonia may be admitted to form the electrolyte, the cell requiring only the completion of the circuit to produce current. Of course, the cell can also be activated or made ready for use by introducing a solution of electrolyte solute in liquid ammonia.

FIGURE 2 illustrates a self-contained, ammonia-vapor-activated cell unit in which the ammonia is located in a compartment separated from the cell proper by a rupturable diaphragm. In this figure, 10 represents an outer cylindrical casing or container such as of steel. 11 represents a cylindrical cell casing which serves as the anode and hence is of an electropositive metal as described hereinabove. Cell casing 11 is provided with ports 12 for admission of ammonia vapor, and a slot or groove (not shown) may be provided longitudinally along casing 11 to allow the activating ammonia vapor to flow from compartment 22 into and through ports 12. Preferably, a plurality of rows of ports is provided, such as rows 120° apart about the periphery of cell casing 11. A paper cylinder 13, impregnated with electrolyte solute salt may be located inside and adjacent cell casing 11. The numerals 14 represent bodies of electrolyte solute shown here as centrally apertured paper discs impregnated with electrolyte solute. Upper solute body 14 is insulated from outer casing 10 as by layer 18 of synthetic resin or elastomer, such as nylon. 15 is a further paper disc impregnated with electrolyte solute but containing no central opening thus lying between tubular cathode conductor 16 and cell casing 11. The numerals 17 represent bodies of ammoniated depolarizer preferably admixed with a finely divided conductive material. Ports 29 are provided for the introduction of ammonia into the cell by way of tubular cathode conductor 16 to ammoniate or to complete ammoniation of the depolarizer, if necessary, prior to activation. After ammoniation, the upper end of tubular cathode conductor 16 is sealed. Suitable lead wires or connections 19 and 20, respectively, are attached to the outer casing 10, which is in electrical contact with the anode, and cathode conductor 16, respectively. A quantity of anhydrous, liquid ammonia 21 is held in compartment 22 in the lower portion of outer casing 10, separated from the cell compartment by a frangible membrane or diahphragm 23 adapted to rupture at a rapid increase in pressure within compartment 22. Such a diahphragm should be inert towards liquid ammonia, such as thin, for example 4 mil, steel. Heating cartridge 24 is held within recess 25, formed in the lower end of outer casing 10, by a plug or solidified resin 26. Application of current through connections 27 and 28, initiates cartridge 24 thus generating heat. The heated ammonia, tending to vaporize, builds up pressure in compartment 22 until diaphragm 23 ruptures permitting ammonia vapor to flow through the slot or groove in cell casing 11 and into the cell through ports 12. The cell thus becomes activated, and, with the circuit completed through leads 19 and 20, generates current. The number of electrolyte layers and of ammoniated depolarizer layers is not critical and any convenient number may be employed.

Figure 3:
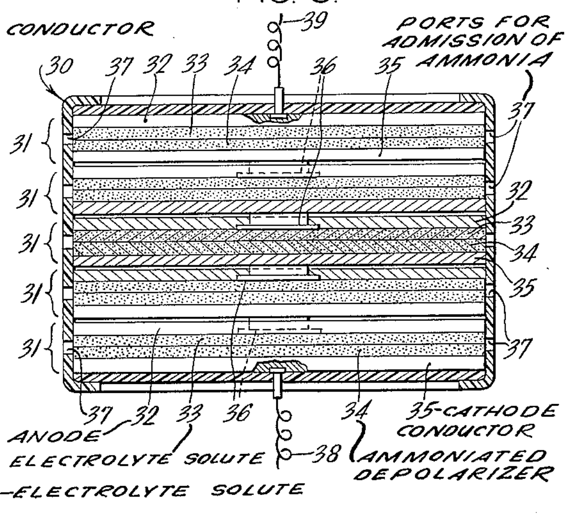
FIGURE 3 illustrates schematically, a side elevational view, partly in section, a form of battery comprising a plurality of cells in a single compartment.

FIGURE 3 illustrates a battery, that is, a plurality of individual cells, in which the cells are interconnected and within a common chamber. An outer insulating casing 30, preferably of a synthetic resin is provided. Each cell 31 is made up of the same components: 32 is the anode in the form of a thin disc; 33 is a body of electrolyte solute shown here as a paper disc impregnated with solute salt; 34 is a body of ammoniated depolarizer, and 35 is the cathode conductor in the form of a thin disc. The cathode conductor of each cell is electrically connected to the anode of the next, below succeeding cell by means of a conductive pin or rivet 36 inserted through a hole in the anode and soldered to the cathode conductor. The lowermost cathode conductor is connected to a lead 38, and the uppermost anode is connected to a lead 39. Casing 30 is provided with ports 37 for the admission of ammonia, either as a liquid or gas, to the cell system. Where ammoniated depolarizer 34, is ammoniated in situ in the cell, ammonia may be introduced into the depolarizer or partially ammoniated depolarizer by means of ports 37. Until activation, these ports may then be temporarily sealed, and this may include encasing the entire battery assembly in an outer envelope, jacket or casing (not shown). Activation of the battery is achieved by the admission of an activating amount of ammonia into the cell system as through ports 37. Although the drawing shows five cells, it will be understood that any convenient and reasonable number of cells may make up the battery.

Ammoniation of the depolarizer can be accomplished in situ in the cell prior to the activation by means other than the direct introduction of ammonia into the cell. For example, the depolarizer could be mixed with an ammonia-containing salt, such as $CaCl_2 \cdot 8NH_3$, which, under elevated temperature conditions, would release ammonia sufficient for the desired ammoniation. On the other hand, a small container or containers of ammonia could be positioned in the cell, such as throughout the depolarizer, in such a manner that ammonia could be released therefrom for ammoniation of the depolarizer prior to activation.

It is recommended that the cell compartment, before the addition of the ammonia for activation, be free of moisture, and, preferably, also substantially free of air.

The following examples illustrate the preparation and operation of the improved cell system of the present invention, but are not intended to limit the scope of the invention in any way:

EXAMPLE I

At −50° C. three hundred grams of mercuric sulfate are gradually added to 400 cc. of a .5%, by weight, solution of ammonium thiocyanate in anhydrous liquid ammonia. During the reaction, heat is generated with turbulence which continues for about an hour. The mercuric sulfate increases in volume forming, upon decantation and evaporation of excess free ammonia after completion of the reaction, $HgSO_4 \cdot 4NH_3$ in the form of a white powder. This material is converted to $$HgSO_4 \cdot 2NH_3$$

by heating to 150° C. under a vacuum of 100 microns mercury. The resulting compound is a white powder stable if protected from light.

EXAMPLE II

A battery is prepared similar in structure to that shown in FIGURE 3. The battery contains six cells, in each of which: the anode is a disc ½" in diameter by 5 mils thick of a magnesium based alloy (3% Al, 1% αn, balance Mg); the solute is 25 mg. of ammonium thiocyanate impregnated into a rayon non-woven fabric (½" in diameter by 8 mils thick); and the cathode is a silver disc (½" in diameter by 3 mils thick) to which is pasted a mixture of diammoniated mercuric sulfate and air-separated, 10 microns graphite (3:1 by weight) and a 1% solution of polystyrene in toluene, followed by drying.

The assembled battery stack is placed within a close-fitting steel chamber. The battery is electrically connected, through insulated hermetic seals, to a resistive load manually adjusted to maintain a current discharge of 20 milliamperes. The chamber is vacuated and refrigerated to −70° F. The battery is activated by admitting anhydrous liquid ammonia, at −70° F., under a pressure of 300 p.s.i.

The results are set forth in the table following Example III, on a single cell basis, and are compared with a similar battery in which the cathode contained mercuric sulfate which was not previously ammoniated.

EXAMPLE III

In this example a battery is prepared and operated as in Example II using a different depolarizer body. In this case the depolarizer body is made by mixing the diammoniated mercuric sulfate and graphite (3:1, by weight) with separated paper-making fibers in an amount of 5%, by weight, based on the weight of the diammoniated mercuric sulfate: graphite combination. Sufficient 5% aqueous solution of ammonium thiocyanate is added to form a filterable slurry. This is filtered on filter paper to form a mat which is lightly pressed between filter paper to a thickness of 40 mils. The mat is then air-dried, and a 0.2 gram disc ½" in diameter is cut and the disc placed next to the silver disc cathode conductor to provide the cathode assembly.

The results are set forth in the following table, on a single cell basis, and compared with a similar battery in which the cathode contains mercuric sulfate which had not been previously ammoniated.

*Table*

| Example | Performance, 20 ma. load, −70° F. | | |
|---|---|---|---|
| | Peak c.c.v.[1] | Life in minutes to percent of peak c.c.v. | |
| | | 90% | 80% |
| II | 1.92 | 5 | 8 |
| II Control | 2.02 | 0.8 | 1.8 |
| III | 2.02 | 12.5 | 15 |
| III Control | 1.95 | 7.5 | 9 |

[1] Closed circuit voltage (single cell basis).

EXAMPLE IV

Two anode grids are prepared from 16 mil sheet stock of an alloy consisting of 3% aluminum, 1% zinc and the balance magnesium. Slits are formed in the sheet and the sheets stretched to form a diamond-shaped pattern resembling lath. Each anode is cut to generally rectangular shape 2.9" x 2.8" with a tab being permitted to extend from one end of each. Each is covered on both faces with 14 mil vinyl resin-coated fiber glass 12 mesh screen, the edges being heat sealed and trimmed to provide a sandwich.

A cathode conductor grid is prepared from 16 mil copper sheeting also slit and stretched to provide a lath-like grid. The grid is silver plated to a depth of 2 mils on all surfaces. This is also cut to a generally rectangular shape 2.9" x 2.8", a tab being provided on one end. A mixture is prepared from seven parts, by weight, of finely-divided diammoniated mercuric sulfate (prepared according to Example I) and three parts, by weight, of finely-divided carbon and this is formed into a paste using a 1% solution of polystyrene in toluene. The paste is applied to both sides of the silver-plated grid, and the assembly is air-dried for 24 hours while protecting it from light and moisture.

The resulting cathode assembly is placed in a porous paper bag and sandwiched between the two anode assemblies, and the resulting assembly is clamped together by elastomer bands. The anode tabs are connected together and along with the cathode conductor are connected into a circuit containing a resistor, an ammeter and a recording voltmeter. The assembly is placed in a polyethylene container. The cell is activated by admitting a 10 mol percent solution of potassium thiocyanate in liquid ammonia into the container, at −67° F., in an amount sufficient to flood the components.

The cell produced 30 amperes of current at 1.5 volts dropping to 75% of peak closed circuit voltage in 1 minute.

By comparison, without ammoniation of the heavy metal sulfate similar electrical results are obtained only if the cell is strongly cooled or otherwise prevented from boiling, and physical expansion allowed. Ammoniation with neutral liquid ammonia decreases the heat and swelling but gives only half the closed circuit voltage and life as above.

The following example illustrates the preparation and operation of an improved cell system of the invention wherein the heavy metal sulfate depolarizer is preammoniated in situ prior to activation.

EXAMPLE V

A bobbin type cell is prepared from a magnesium case (2 3/16" x 5/8" outside diameter; 9/16" inside diameter) which serves as an anode. About the inner periphery and bottom of the magnesium case is placed a layer of rayon, non-woven fabric which has been saturated with a saturated aqueous solution of potassium thiocyanate and dried. A 1/8" hollow, sterling silver tube, provided with holes along its length, is inserted axially into the magnesium case to serve as a cathode conductor. The case is filled with alternating layers of a diammoniated mercuric sulfate: carbon (7:3) mix, a disc of plain rayon, non-woven fabric and a disc of the same fabric which has been saturated with a saturated aqueous solution of potassium thiocyanate and dried to provide a total of twelve fabric discs (six untreated and six treated). Each disc has a 1/8" hole in the center to accommodate the silver tube cathode. The case is provided with a nylon plug and the extending end of the case is crimped over the plug, with the hollow silver tube extending through the plug. Before closing the silver tube with a nylon plug, the cell is subjected to a vacuum for 24 hours and after closing with the plug a vacuum is drawn on the cell for an additional 24 hours.

The diammoniated mercuric sulfate depolarizer is further ammoniated by slowly admitting gaseous ammonia, through the hollow silver tube to a final pressure of about 45 p.s.i.a. The temperature of the cell rises slightly and slight expansion of the depolarizer is noted. The cell returns to ambient temperature and is then removed from the ammonia source and sealed, with ammonia at one atmosphere remaining in the cell.

The cell is activated by introducing liquid ammonia through the silver cathode tube under a pressure of about 425 p.s.i.a. for four minutes at room temperature. A nylon pin is then driven into the open end of the hollow, silver cathode tube to seal the cell. The cell is placed in an alcohol bath at −40° C., electrical connections are made between the anode, cathode and a constant load device to drain each cell at 320 milliamperes and the necessary voltage and current recording instruments. The results are as follows: peak closed circuit voltage, 2.25 volts; initial flash current, 3.0 amperes; life to 90% of peak closed circuit voltage, 70 minutes; and life to 75% of peak closed circuit voltage, 84 minutes.

EXAMPLE VI

Lead sulfate is soaked in liquid ammonia containing .5% by weight, of ammonium thiocyanate at −50° C. for about one hour. After removal of excess ammonia by decantation and evaporation, the solid material is subjected to a vacuum of 100 microns of mercury for 24 hours. The resulting material is then used in the preparation of a cell following the procedure of Example V. Upon activation of the cell, the results are as follows: peak closed circuit voltage, 1.75 volts; initial flash current, 2.5 amperes; life to 90% of peak closed circuit voltage, 25 minutes; and life to 75% of peak closed circuit voltage, 35 minutes.

EXAMPLE VII

Silver sulfate, 3.25 grams, is placed in a steel container. The container is then evacuated and gaseous ammonia is admitted through a capillary tube from a line pressure of 45 p.s.i.a. until pressure equilibrium is obtained and the temperature of the container returns to ambient. The material gains about 0.9 gram in weight, which is equivalent to 5 molecules of ammonia per molecule of silver sulfate. The material is then subjected to a vacuum of 100 microns of mercury for 24 hours, which results in the removal of two molecules of ammonia. The resulting material is then used in the preparation of a cell following the procedure of Example V. Upon activation of the cell, the results are as follows: peak closed circuit voltage, 2.25 volts; initial flash current, 5 amperes; and life to 75% of peak closed circuit voltage, 17 minutes.

EXAMPLE VIII

A cell is prepared following the procedure of Example V using cupric chloride in place of the diammoniated mercuric sulfate. Upon activation of the cell, the results are as follows: peak closed circuit voltage, 2.05 volts; initial flash current, 3 amperes; life to 90% of peak closed circuit voltage, 14 minutes; and life to 75% of peak closed circuit voltage, 34 minutes.

EXAMPLE IX

A cell is prepared following the procedure of Example V using meta-dinitrobenzene in place of the diammoniated mercuric sulfate. After activation of the cell the results are as follows (using a 10 milliampere load): peak closed circuit voltage, 1.9 volts; initial flash current, 2 amperes; life to 90% of peak closed circuit voltage, 15 hours; and life to 75% of peak closed circuit voltage, 30 hours.

EXAMPLE X

A cell is prepared following the procedure of Example V using flowers of sulfur in place of the diammoniated mercuric sulfate, omitting potassium thiocyanate from the cell, using gaseous ammonia at 110 p.s.i.a. to ammoniate the sulfur without reducing the pressure after ammoniation, and using a 10 mol percent solution of potassium thiocyanate in liquid ammonia to activate the cell. The results are as follows (using a 10 milliampere load): peak closed circuit voltage, 1.8 volts; life to 90% of peak closed circuit voltage, 10 hours; and life to 75% of peak closed circuit voltage, 30 hours. A flash current reading is not taken with this system because high current densities are detrimental to the depolarizer material.

Modification is possible in the selection of anode, cathode conductor and electrolyte solute components and combinations as well as in the particular ammoniated heavy metal sulfate selected for such combinations without departing from the scope of the invention.

I claim:

1. In a liquid ammonia, deferred action, electric current-producing cell system activatable upon the introduction of liquid ammonia, involving an anode, a cathode conductor and electrolyte solute soluble in liquid ammonia and free of liquid ammonia and in an amount to provide, upon introduction of liquid ammonia upon activation, at least about 1 mol percent of solute concentration to render said ammonia electrically conductive, the improvement comprising, in contact with said cathode conductor, a dry, solid ammoniated sulfate of a heavy metal below ferrous iron in the electrochemical series, said ammoniated sulfate containing at least one molecule of ammonia of ammoniation per molecule of heavy metal sulfate but being free of liquid ammonia, and said anode, solute and ammoniated sulfate being so arranged that, upon introduction of liquid ammonia, the resulting electrolyte solution contacts said anode and said ammoniated sulfate.

2. The deferred action cell system of claim 1 wherein said ammoniated sulfate comprises ammoniated mercuric sulfate.

3. In a liquid ammonia, deferred action, electric current-producing cell system activatable upon the introduction of liquid ammonia, involving an anode, a cathode conductor and electrolyte solute soluble in liquid ammonia and free of liquid ammonia, and in an amount to provide, upon introduction of liquid ammonia upon activation, at least about 1 mol percent of solute concentration to render said ammonia electrically conductive, the improvement comprising, in contact with said cathode conductor, a conductive mixture of a dry, solid ammoniated sulfate of a heavy metal below ferrous iron in the electrochemical series and of a finely-divided electrically conductive material, said ammoniated sulfate containing at least one molecule of ammonia of ammoniation per molecule of heavy metal sulfate but being free of liquid ammonia, and said anode, solute and conductive mixture being so arranged that, upon introduction of liquid ammonia, the resulting electrolyte solution contacts said anode and said conductive mixture.

4. A deferred action, electric current-producing cell device activatable upon the introduction of liquid ammonia, comprising an electropositive metal anode and a cathode conductor; an anolyte solute soluble in liquid ammonia and free of liquid ammonia comprising a salt the cation of which is selected from the group consisting of ammonium and an electropositive metal, said solute being in an amount to provide, upon introduction of liquid ammonia upon activation, at least about 1 mol percent of solute concentration to render said ammonia electrically conductive, and, in contact with said cathode conductor, a dry, solid ammoniated sulfate of a heavy metal below ferrous iron in the electrochemical series, said ammoniated sulfate containing at least one molecule of ammonia of ammoniation per molecule of heavy metal sulfate but being free of liquid ammonia, and said anode, solute and ammoniated sulfate being so arranged that, upon introduction of liquid ammonia, the resulting electrolyte solution contacts said ammoniated sulfate and the anolyte portion thereof contacts said anode.

5. The deferred action cell device of claim 4 wherein said ammoniated sulfate comprises mercuric sulfate.

6. An ammonia-activatable, deferred action, electric current-producting cell device comprising a cell compartment and, within said cell compartment, an anode, a cathode conductor, and in contact with said cathode conductor, a dry, solid ammoniated sulfate of a heavy metal below ferrous iron in the electrochemical series, said ammoniated sulfate containing at least one molecule of ammonia of ammoniation per molecule of heavy metal sulfate but being free of liquid ammonia and said anode and ammoniated sulfate being arranged such that, upon introduction of liquid ammonia upon activation, the electrolyte solution, containing at least about 1 mol percent of material dissolved in said ammonia to render it electrically conductive, contacts said anode and said ammoniated sulfate.

7. An ammonia-activatable, deferred action, electric current-producing cell device comprising a cell compartment and, within said cell compartment, an electropositive metal anode, a cathode conductor, electrolyte solute free of any electrolyte solvent and comprising a salt the cation of which is selected from the group consisting of ammonium and electropositive metals, said solute being in an amount to provide, upon introduction of liquid ammonia upon activation, at least about 1 mol percent of solute concentration to render said ammonia electrically conductive, and, in contact with said cathode conductor, a dry, solid ammoniated sulfate of a heavy metal below ferrous iron in the electrochemical series, and means for introducing ammonia to said compartment, said ammoniated sulfate containing at least one molecule of ammonia of ammoniation per molecule of heavy metal sulfate but being free of liquid ammonia, and said anode, solute and ammoniated sulfate being so arranged that, upon introduction of liquid ammonia, the resulting electrolyte solution contacts said anode and said ammoniated sulfate.

8. An ammonia-activatable, deferred action, electric current-producing cell device comprising a cell compartment and, within said cell compartment, an anode, a cathode conductor and, in contact with said cathode conductor, a conductive mixture of a dry, solid ammoniated sulfate of a heavy metal below ferrous iron in the electrochemical series and of finely-divided electrically conductive material, and means for introducing ammonia to said cell compartment, said ammoniated sulfate containing at least one molecule of ammonia of ammoniation per molecule of heavy metal sulfate but being free of liquid ammonia, and said anode and conductive mixture being so arranged that, upon introduction of liquid ammonia upon activation, the electrolyte solution, containing at least about 1 mol percent of material dissolved in said ammonia to render it electrically conductive, contacts said anode and said conductive mixture.

9. The device of claim 8 wherein said ammoniated sulfate is ammoniated mercuric sulfate, and wherein said finely-divided conductive material mixed with said ammoniated sulfate is carbon.

10. An ammonia-activatable, deferred action, electric current-producing battery device comprising a plurality of electrically connected cells within a common compartment, each cell comprising an electropositive metal anode, a cathode conductor, electrolyte solute soluble in liquid ammonia and free of liquid ammonia and in an amount to provide, upon introduction of ammonia upon activation, at least about 1 mol percent of solute concentration to render said ammonia electrically conductive, and, in contact with said cathode conductor, a dry, solid ammoniated sulfate of a heavy metal below ferrous iron in the electrochemical series, and means for introducing ammonia into said cells, said ammoniated sulfate containing at least one molecule of ammonia of ammoniation per molecule of heavy metal sulfate but being free of liquid ammonia, and said anode, solute and ammoniated sulfate being so arranged that, upon introduction of liquid ammonia, the resulting electrolyte solution contacts said anode and said ammoniated sulfate.

11. The battery of claim 10 wherein said ammoniated sulfate is ammoniated mercuric sulfate.

12. In a liquid ammonia, deferred action, electric current-producing cell system activatable upon the introduction of liquid ammonia, involving an anode, a cathode conductor and electrolyte solute soluble in liquid ammonia and free of liquid ammonia and in an amount to render the liquid ammonia, upon its introduction for activation, electrically conductive, the improvement, serving as at least a portion of said electrolyte solute and as depolarizer, comprising, in contact with said cathode conductor and under an atmosphere of ammonia gas, a dry, solid reaction product between ammonia and an ammonia cell system depolarizer reactable with ammonia selected from the group consisting of sulfates of heavy metals below ferrous iron in the electrochemical series, cupric chloride, elemental sulfur and aromatic organic compounds having at least one —$NO_x$ group, where $x$ is an integer selected from 1 and 2, attached directly to the aromatic nucleus, said dry, solid reaction product containing at least one molecule of ammonia of ammoniation per molecule of depolarizer but being free of liquid ammonia, and said anode, said reaction product and any additional electrolyte solute being so arranged that upon introduction of liquid ammonia, the resulting electrolyte solution contacts said anode and said cathode conductor.

13. The deferred action cell system of claim 12 wherein said depolarizer comprises an aromatic organic compound having at least one —$NO_x$ group, where $x$ is an integer selected from 1 and 2, attached directly to the aromatic nucleus.

14. The deferred action cell system of claim 13 wherein said aromatic compound is a nitrobenzene.

15. The deferred action cell system of claim 12 wherein said depolarizer is elemental sulfur.

16. The deferred action cell system of claim 12 wherein said depolarizer is cupric chloride.

17. The deferred action cell system of claim 14 wherein said nitrobenzene is a dinitrobenzene.

18. The deferred action cell system of claim 17 wherein said dinitrobenzene is m-dinitrobenzene.

References Cited by the Examiner

UNITED STATES PATENTS

| | | | |
|---|---|---|---|
| 2,937,219 | 5/1960 | Minnick et al. | 136—6 |
| 2,976,342 | 3/1961 | Morehouse et al. | 136—100 |
| 2,993,946 | 7/1961 | Lozier | 136—90 |
| 2,996,562 | 8/1961 | Meyers | 136—90 |
| 3,083,252 | 3/1963 | Meyers | 136—153 |

OTHER REFERENCES

Kraus: The Properties of Electrically Conducting Systems, New York, 1922, p. 314.

WINSTON A. DOUGLAS, *Primary Examiner.*

JOHN R. SPECK, MURRAY TILLMAN, JOHN MACK, *Examiners.*